(12) United States Patent
Yasunori

(10) Patent No.: US 10,601,215 B2
(45) Date of Patent: Mar. 24, 2020

(54) ON-VEHICLE POWER SOURCE SWITCH APPARATUS AND CONTROL APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Hiromichi Yasunori, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 17 days.

(21) Appl. No.: 15/779,117

(22) PCT Filed: Mar. 16, 2017

(86) PCT No.: PCT/JP2017/010557
§ 371 (c)(1),
(2) Date: May 25, 2018

(87) PCT Pub. No.: WO2017/169817
PCT Pub. Date: Oct. 5, 2017

(65) Prior Publication Data
US 2019/0013664 A1 Jan. 10, 2019

(30) Foreign Application Priority Data

Mar. 30, 2016 (JP) .................................. 2016-067383

(51) Int. Cl.
*H02H 3/16* (2006.01)
*B60R 16/033* (2006.01)
(Continued)

(52) U.S. Cl.
CPC ............... *H02H 3/16* (2013.01); *B60R 16/03* (2013.01); *B60R 16/033* (2013.01);
(Continued)

(58) Field of Classification Search
CPC .......... H02H 3/16; H02H 1/0007; H02H 3/05; H02J 7/1461; H02J 7/0068; H01M 10/42;
(Continued)

(56) References Cited

U.S. PATENT DOCUMENTS 9,705,319 B2* 7/2017 Morita ................ H01M 10/425
2012/0182024 A1* 7/2012 Ike ....................... G01R 31/025
324/509

(Continued)

FOREIGN PATENT DOCUMENTS

JP S60-148326 A 8/1985
JP 2008-211891 A 9/2008
JP 2015-076959 A 4/2015

OTHER PUBLICATIONS

Search Report for PCT/JP2017/010557, dated Apr. 25, 2017.

*Primary Examiner* — Rexford N Barnie
*Assistant Examiner* — Terrence R Willoughby
(74) *Attorney, Agent, or Firm* — Honigman LLP

(57) ABSTRACT

An on-vehicle power source switch apparatus configured to switch off a switch when a ground fault occurs is provided. A first system includes a generator, a first power storage that powers a first vehicle load. A second system includes a second power storage device that powers a second vehicle load. A separation switch is connected between the first and the second systems. A first and a second control circuits respectively output a first and a second provisional control signals for controlling the separation switch. A logic circuit switches on the separation switch when both the first and the second provisional controls signal indicate on. When power (Continued)

is generated, the first and the second control circuits output respective first and second provisional control signals indicating on, and when a ground fault has occurred, the first and second control circuits output the first and second provisional control signals indicating off.

14 Claims, 4 Drawing Sheets

(51) Int. Cl.
    *H02J 7/00*     (2006.01)
    *H02H 1/00*     (2006.01)
    *H02H 3/05*     (2006.01)
    *H01M 10/42*     (2006.01)
    *B60R 16/03*     (2006.01)
    *H02J 7/14*     (2006.01)

(52) U.S. Cl.
    CPC ......... *H01M 10/42* (2013.01); *H01M 10/425* (2013.01); *H02H 1/0007* (2013.01); *H02H 3/05* (2013.01); *H02J 7/0068* (2013.01); *H02J 7/1461* (2013.01); *H01M 2010/4271* (2013.01); *H01M 2220/20* (2013.01)

(58) Field of Classification Search
    CPC ........... H01M 10/425; H01M 2220/20; H01M 2010/4271; B60R 16/03; B60R 16/033
    See application file for complete search history.

(56) References Cited

U.S. PATENT DOCUMENTS

2017/0080883 A1*   3/2017   Yasunori ................. B60R 16/02
2019/0071039 A1*   3/2019   Tsukamoto ........... B60R 16/033

* cited by examiner

ON-VEHICLE POWER SOURCE SWITCH APPARATUS AND CONTROL APPARATUS

CROSS-REFERENCE TO RELATED APPLICATIONS

This application is the U.S. national stage of PCT/JP2017/010557 filed Mar. 16, 2017, which claims priority of Japanese Patent Application No. JP 2016-067383 filed Mar. 30, 2016.

TECHNICAL FIELD

This invention relates to an on-vehicle power source switch apparatus and a control apparatus.

BACKGROUND

JP 2012-130108A describes a vehicle in which a lead storage battery and a lithium ion battery are installed. The lead storage battery is directly connected to an alternator, a starter, and a first electric load. This lead storage battery is also connected to a second electric load via a bidirectional semiconductor switch. The lithium ion battery is connected to the second electric load via a Li (lithium) battery relay.

In JP 2012-130108A, the charge rates of the lead storage battery and the lithium ion battery are calculated, and the semiconductor switch and the Li battery relay are controlled based on conditions that utilize the charge rates and the like.

For example, in JP 2012-130108A, when a ground fault occurs between the lead storage battery and the semiconductor switch, the lithium ion battery can be cut off from the ground fault by switching off the semiconductor switch. Accordingly, the lithium ion battery can supply power to the second electric load. However, in JP 2012-130108A, a single ECU (Electronic Control Unit) switches off the semiconductor switch. Therefore if some sort of problem occurs in this ECU, the semiconductor switch cannot be switched off, and the lithium ion battery cannot be cut off from the ground fault.

In view of this, an object of the present invention is to provide an on-vehicle power source switch apparatus that can reliably switch off a switch that is provided between two power storage devices when a ground fault occurs.

SUMMARY

A first aspect of an on-vehicle power source switch apparatus according to the present invention includes a separation switch, a first control circuit, a second control circuit, and a logic circuit. The separation switch is connected between a first system and a second system. The first system includes a generator, a first power storage device, and a first vehicle load. The generator generates power at least at a time of vehicle regeneration. The first power storage device is charged by the generator. The first vehicle load receives power from the first power storage device. The second system includes a second power storage device and a second vehicle load. The second vehicle load receives power from the second power storage device. The first control circuit outputs a first provisional control signal for controlling on/off switching of the separation switch. The second control circuit outputs a second provisional control signal for controlling on/off switching of the separation switch. The logic circuit switches off the separation switch when at least either one of the first provisional control signal and the second provisional control signal indicates off, and switches on the separation switch when both the first provisional control signal and the second provisional control signal indicate on. In accordance with a start of power generation by the generator, the first control circuit and the second control circuit output the first provisional control signal and the second provisional control signal that indicate on, and when a ground fault occurs in the first system or the second system, the first control circuit and the second control circuit output the first provisional control signal and the second control signal that indicate off.

A second aspect of the on-vehicle power source switch apparatus according to the present invention is the on-vehicle power source switch apparatus according to the first aspect, further including a first switch and a second switch. The first switch is connected between the first power storage device and each of the generator and the first vehicle load, and on/off switching of the first switch is controlled by the first control circuit. The second switch is connected between the second vehicle load and the second power storage device, and on/off switching of the second switch is controlled by the second control circuit.

A third aspect of the on-vehicle power source switch apparatus according to the present invention is the on-vehicle power source switch apparatus according to the second aspect, further including a voltage detection circuit. The voltage detection circuit detects a terminal voltage of the first power storage device on a first power storage device side of the first switch. In a state where the first switch is off, the second switch is on, and the separation switch is on, the first control circuit obtains a charge rate of the first power storage device based on the terminal voltage.

A fourth aspect of the on-vehicle power source switch apparatus according to the present invention is the on-vehicle power source switch apparatus described in the second or third aspect, wherein when the vehicle is running under power or parked, the first control circuit switches on the first switch and outputs the first provisional control signal that indicates off, and the second control circuit switches on the second switch and outputs the second provisional control signal that indicates off.

A fifth aspect of the on-vehicle power source switch apparatus according to the present invention is the on-vehicle power source switch apparatus according to any one of the second to fourth aspects, wherein the first switch and the second switch are normally-on switches, and the separation switch is a normally-off switch.

A sixth aspect of the on-vehicle power source switch apparatus according to the present invention is the on-vehicle power source switch apparatus according to any one of the first to fifth aspects, including a package in which the separation switch, the first control circuit, the second control circuit, and the logic circuit are accommodated.

One aspect of a control apparatus according to the present invention is an apparatus that controls an on-vehicle power source switch apparatus. The switch apparatus includes a separation switch. The separation switch is connected between a first system and a second system. The first system includes a generator, a first power storage device, and a first vehicle load. The generator generates power at least at a time of vehicle regeneration. The first power storage device is charged by the generator. The first vehicle load receives power from the first power storage device. The second system includes a second power storage device and a second vehicle load. The second vehicle load receives power from the second power storage device. The control apparatus includes a first control circuit, a second control circuit, and a logic circuit. The first control circuit outputs a first provisional control signal for controlling on/off switching of the separation switch. The second control circuit outputs a second provisional control signal for controlling on/off switching of the separation switch. The logic circuit switches off the separation switch when at least either one of the first provisional control signal and the second provisional control signal indicates off, and switches on the separation switch when both the first provisional control signal and the second provisional control signal indicate on. In accordance with a start of power generation by the generator, the first control circuit and the second control circuit output the first provisional control signal and the second provisional control signal that indicate on, and when a ground fault occurs in the first system or the second system, the first control circuit and the second control circuit output the first provisional control signal and the second control signal that indicate off.

Advantageous Effects of Invention

According to the first aspect of the on-vehicle power source switch apparatus and the aspect of the control apparatus of the present invention, even if either one of the first control circuit and the second control circuit runs out of control, the separation switch can be switched off by the other one, and therefore a case where a ground fault that occurred in either one of the first system and the second system influences the other one can be suppressed more reliably.

According to the second aspect of the on-vehicle power source switch apparatus of the present invention, there is no need for the first switch and the second switch to be provided with respective logic circuits for control thereof. In this case, it is possible to reduce manufacturing cost and the circuit scale. Also, in response to a ground fault on the first power storage device side of the first switch, the ground fault and the second system can be cut off from each other by switching off the first switch. Similarly, in response to a ground fault on the second power storage device side of the second switch, the ground fault and the first system can be cut off from each other by switching off the second switch.

According to the third aspect of the on-vehicle power source switch apparatus of the present invention, the charge rate can be calculated based on the open circuit voltage, and therefore the charge rate can be calculated with high precision. Also, not only the second switch, but also the third switch is switched on, and therefore it is possible to supply power from the second power storage device to not only the second vehicle load but also the first vehicle load while also calculating the charge rate of the first power storage device based on the open circuit voltage.

According to the fourth aspect of the on-vehicle power source switch apparatus of the present invention, power can be supplied to the first vehicle load and the second vehicle load in a state where the first system and the second system are independent from each other. Also, if a ground fault occurs in either one of the first system and the second system in this state, the ground fault can be prevented from influencing the other system without waiting for a ground fault occurrence determination.

According to the fifth aspect of the on-vehicle power source switch apparatus of the present invention, when the vehicle is parked, for example, it is possible to suppress power by switching on the first switch and the second switch and switching off the separation switch.

According to the sixth aspect of the on-vehicle power source switch apparatus of the present invention, the switch apparatus can be handled as a single body, thus facilitating attachment.

DETAILED DESCRIPTION OF PREFERRED EMBODIMENTS

Configuration

Figure 1:
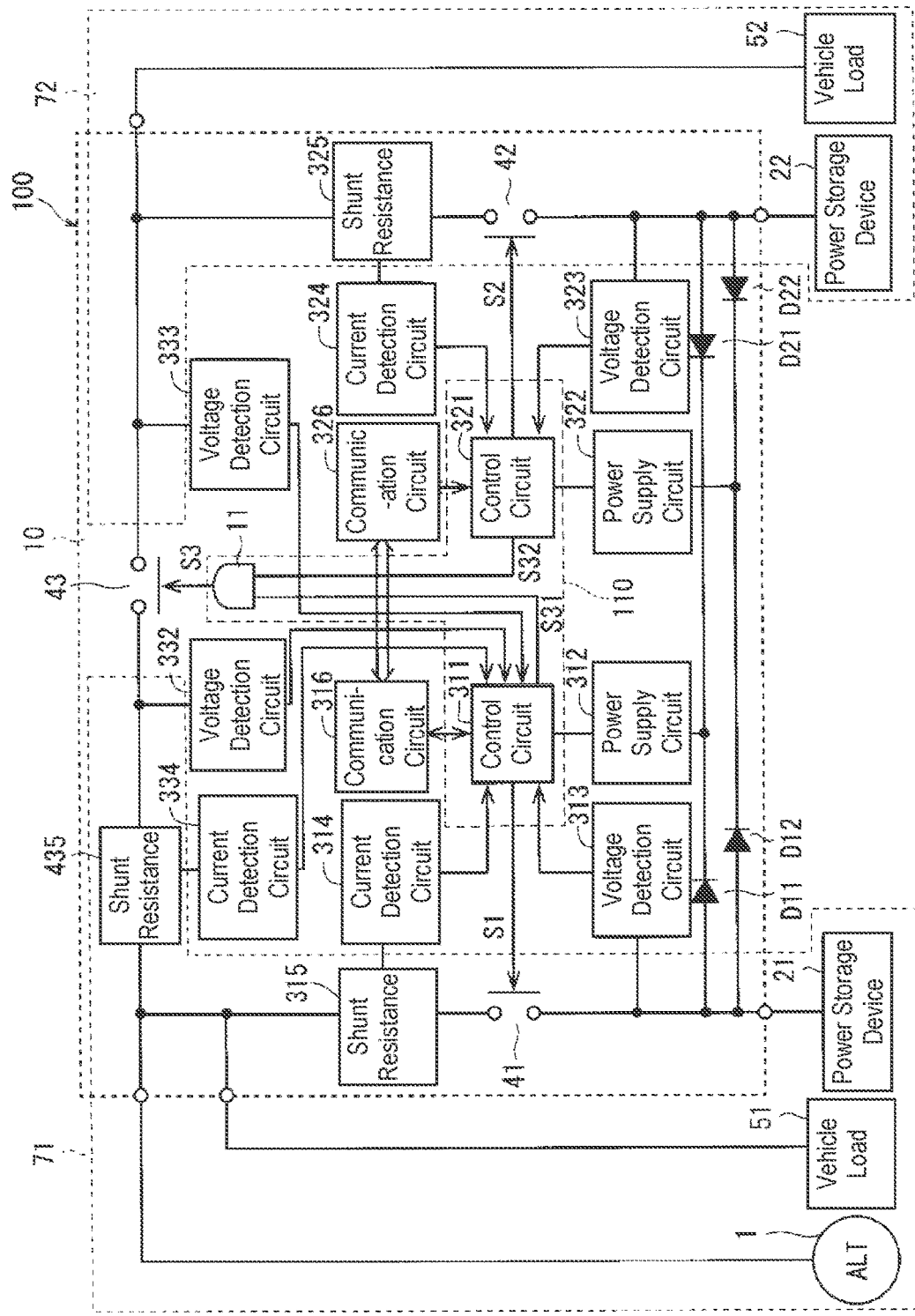
FIG. 1 is a diagram schematically showing an example of an on-vehicle power supply system.

FIG. 1 is a diagram schematically showing an example of the configuration of an on-vehicle power supply system 100. This on-vehicle power supply system 100 is for installation in a vehicle. The on-vehicle power supply system 100 includes an on-vehicle power source switch apparatus 10, a generator 1, power storage devices 21 and 22, and vehicle loads 51 and 52.

The generator 1 is an alternator for example, and is indicated by "ALT" in FIG. 1. For example, the generator 1 generates power along with rotation of an engine, and outputs DC voltage. For example, this generator 1 may generate and output regenerative power during vehicle regeneration. Accordingly, it is possible to effectively utilize energy that accompanies vehicle regeneration. Note that the regeneration referred to here means traveling of the vehicle in the state where the accelerator position is the initial value (the value at which the accelerator pedal is not being pressed by a driver).

The power storage device 21 is a lead battery, for example, and the power storage device 22 is a lithium ion battery or a nickel metal hydride battery, for example. The power storage devices 21 and 22 are charged by the generator 1 via a switch apparatus 10, and supply power to the vehicle loads 51 and 52 via the switch apparatus 10.

The vehicle loads 51 and 52 are loads installed in the vehicle. For example, the vehicle loads 51 and 52 may have the same function. In this case, even if an abnormality occurs in either one of the vehicle loads 51 and 52, a loss of the function thereof can be avoided by the other one exhibiting that function. In other words, redundancy can be provided for the functions of the vehicle loads. The vehicle loads 51 and 52 are headlights, steering electric motors, or brake electric motors, for example. For example, in a vehicle that is capable of autonomous driving, providing redundancy for the function of a traveling-related load is effective for stable autonomous driving.

The switch apparatus 10 can appropriately connect the generator 1, the power storage devices 21 and 22, and the vehicle loads 51 and 52. For example, the switch apparatus 10 includes switches 41 and 42, a separation switch 43, and a control apparatus 110. The control apparatus 110 includes control circuits 311 and 321 and a logic circuit 11. Note that as shown in FIG. 1, the switch apparatus 10 may further include communication circuits 316 and 326, power supply circuits 312 and 322, voltage detection circuits 313, 323, 332, and 333, current detection circuits 314, 324, and 334, and diodes D11, D12, D21, and D22.

The switch 41 is a relay for example, and is connected between the generator 1 and the power storage device 21, or between the vehicle load 51 and the power storage device 21. The switch 42 is a relay for example, and is connected between the vehicle load 52 and the power storage device 22. The separation switch 43 is a relay for example, and is connected between one end of the switch 41 on the vehicle load 51 side and one end of the switch 42 on the vehicle load 52 side. In other words, the separation switch 43 is connected to the power storage device 21 via the switch 41, and is connected to the power storage device 22 via the switch 42.

The switch apparatus 10 appropriately electrically connects the generator 1, the power storage devices 21 and 22, and the vehicle loads 51 and 52 by switching on and off the switches 41 and 42 and the separation switch 43. For example, when the switches 41 and 42 are switched on, and the separation switch 43 is switched off, the generator 1, the power storage device 21, and the vehicle load 51 are electrically connected to each other, and the power storage device 22 and the vehicle load 52 are electrically connected to each other. Also, the generator 1, the power storage device 21, and the vehicle load 51 are electrically separated from the power storage device 22 and the vehicle load 52. At this time, the vehicle load 51 receives power from the generator 1 or the power storage device 21, and the vehicle load 52 receives power from the power storage device 22.

The control circuit 311 controls the on/off switching of the switch 41. Specifically, the control circuit 311 outputs a control signal S1 to the switch 41. The switch 41 turns on and off in accordance with the control signal S1. The control circuit 311 also outputs a provisional control signal S31 for the separation switch 43 to the logic circuit 11.

The control circuit 321 controls the on/off switching of the switch 42. Specifically, the control circuit 321 outputs a control signal S2 to the switch 42. The switch 42 turns on and off in accordance with the control signal S2. The control circuit 321 also outputs a provisional control signal S32 for the separation switch 43 to the logic circuit 11.

The logic circuit 11 outputs a control signal S3 to the separation switch 43 based on the provisional control signals S31 and S32. The logic circuit 11 switches on the separation switch 43 when both of the provisional control signals S31 and S32 indicate the switching on of the separation switch 43, and switches off the separation switch 43 when at least either one of the provisional control signals S31 and S32 indicates the switching off of the separation switch 43. The logic circuit 11 is an AND circuit, for example.

As described above, the control circuits 311 and 321 and the logic circuit 11 together constitute a control apparatus that controls the switches 41 and 42 and the separation switch 43.

Note that here, the control circuit 311 is constituted including a microcomputer and a storage device. The microcomputer executes processing steps (i.e., procedures) described in a program. The storage device can be configured by one or more of various storage devices such as a ROM (Read Only Memory), a RAM (Random Access Memory), a rewritable non-volatile memory (e.g., an EPROM (Erasable Programmable ROM)), and a hard disk device. This storage device stores various types of information, data, and the like, stores programs executed by the microcomputer, and provides a work area for program execution. Note that the microcomputer can also be understood as functioning as various means corresponding to processing steps described in a program, or understood as realizing various functions corresponding to the processing steps. Also, the control circuit 311 is not limited to this, and some or all of various procedures executed by the control circuit 311 or various means or functions realized by the same may be realized by hardware. The same applies to the control circuit 321 as well.

The control circuits 311 and 321 can communicate with each other via the communication circuits 316 and 326. This communication may be performed in compliance with a CAN (Controller Area Network), for example. By communicating with each other, the control circuits 311 and 321 can control coordination between the switches 41 and 42 and the separation switch 43.

The control circuits 311 and 321 can also perform communication with another apparatus via the communication circuits 316 and 326. For example, in the case where an engine ECU (Electronic Control Unit) that is not shown is provided, the control circuits 311 and 321 may receive information indicating vehicle regeneration from the engine ECU. Alternatively, the engine ECU may transmit the accelerator position to the control circuits 311 and 321.

Regenerative Power

In accordance with the start of power generation by the generator 1 for example, the control circuits 311 and 321 output the control signals S1 and S2 for respectively switching on the switches 41 and 42, and respectively output the provisional control signals S31 and S32 for switching on the separation switch 43. Note that it is sufficient that the fact that the generator 1 is outputting regenerative power is notified to the control circuits 311 and 321 by another apparatus, for example. For example, a configuration is possible in which the engine ECU transmits a notification of vehicle regeneration to the control circuits 311 and 321, and the control circuits 311 and 321 determine, based on the notification, that the generator 1 is outputting regenerative power. The logic circuit 11 outputs the control signal S3 for switching on the separation switch 43 based on the provisional control signals S31 and S32. Accordingly, the switches 41 and 42 and the separation switch 43 turn on. Regenerative power is thus supplied from the generator 1 to both of the power storage devices 21 and 22, and the power storage devices 21 and 22 can be charged.

Figure 2:
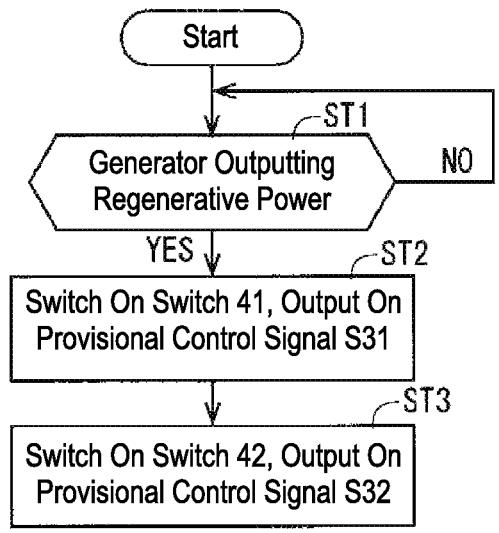
FIG. 2 is a flowchart showing an example of operations of control circuits.

FIG. 2 is a flowchart showing a specific example of the above-described operations of the control circuits 311 and 321. First, in step ST1, the control circuits 311 and 321 determine whether or not the generator 1 has started outputting regenerative power. It is sufficient that this determination is made based on a notification from an external apparatus (e.g., the engine ECU). If it was determined that the output of regenerative power has not started, the control circuits 311 and 321 execute step ST1 again. If it was determined that the output of regenerative power has started, in step ST2, the control circuit 311 switches on the switch 41, and outputs the ON provisional control signal S31. Next, in step ST3, the control circuit 321 switches on the switch 42, and outputs the ON provisional control signal S32. The separation switch 43 thus turns on in accordance with the control signal S3.

Note that the execution order of steps ST2 and ST3 may be reversed, or these steps may be executed in parallel with each other. Also, a configuration is possible in which the determination in step ST1 is made by either one of the control circuits 311 and 321, and the determination result is notified to the other one.

Ground Fault

Hereinafter, consider a ground fault that occurs in an electrical power system. The electrical power system referred to here is a pathway that connects the generator 1, the power storage devices 21 and 22, the switches 41 and 42, the separation switch 43, and the vehicle loads 51 and 52. Also, hereinafter, the portion of the electrical power system that is on the generator 1, power storage device 21, and vehicle load 51 side of the separation switch 43 will also be called a first system 71, and the portion of the electrical power system that is on the power storage device 22 and vehicle load 52 side of the separation switch 43 will also be called a second system 72. The switch 41 belongs to the first system 71, and the switch 42 belongs to the second system 72. The separation switch 43 is connected between the first system 71 and the second system 72, and selects electrical connection and disconnection between these systems.

If a ground fault occurs on the second system 72 side, the control circuits 311 and 321 respectively output the provisional control signals S31 and S32 for switching off the separation switch 43, in order to cut off the second system 72 from the first system 71. It is therefore possible to prevent the ground fault from influencing the first system 71.

Also, the control circuit 311 switches on the switch 41 in order to allow the functioning of the first system 71 in which a ground fault has not occurred. The vehicle load 51 thus receives power from the power storage device 21 or the generator 1, and can exhibit the provided function.

Because a ground fault has occurred in the second system 72, the control circuit 321 may switch off the switch 42. This is because the power storage device 22 cannot supply power to the vehicle load 52.

Also, if a ground fault occurs on the first system 71 side, the control circuits 311 and 321 respectively output the provisional control signals S31 and S32 for switching off the separation switch 43, in order to cut off the first system 71 from the second system 72. It is therefore possible to prevent the ground fault from influencing the second system 72.

Also, the control circuit 321 switches on the switch 42 in order to allow the functioning of the second system 72 in which a ground fault has not occurred. The vehicle load 52 thus receives power from the power storage device 22, and can exhibit the provided function.

Because a ground fault has occurred in the first system 71, the control circuit 311 may switch off the switch 41. This is because the power storage device 21 cannot supply power to the vehicle load 51.

Next, ground fault detection will be described. A ground fault is detected based on voltage or current. As shown in FIG. 1, the voltage detection circuits 313, 323, 332, and 333 and the current detection circuits 314, 324, and 334, which function as ground fault detection units for example, are provided.

For example, on the power storage device 21 side of the switch 41, the voltage detection circuit 313 detects the terminal voltage of the power storage device 21, and outputs the detected voltage to the control circuit 311. For example, on the power storage device 22 side of the switch 42, the voltage detection circuit 323 detects the terminal voltage of the power storage device 22, and outputs the detected voltage to the control circuit 321. The voltage detection circuit 332 detects the voltage that is applied between ground and the line between the switch 41 and the separation switch 43, and outputs the detected voltage to the control circuit 311. The voltage detection circuit 333 detects the voltage that is applied between ground and the line between the switch 42 and the separation switch 43, and outputs the detected voltage to the control circuit 311, for example.

The current detection circuit 314 detects the current flowing in the power storage device 21, and outputs the detected current to the control circuit 311. As shown in FIG. 1, a shunt resistance 315 is provided. The shunt resistance 315 is connected in series with the switch 41 between the power storage device 21 and each of the generator 1 and the vehicle load 51. The current detection circuit 314 detects the voltage across the shunt resistance 315. The current flowing in the shunt resistance 315 can be calculated based on the voltage across the shunt resistance 315 and the resistance value thereof.

The current detection circuit 324 detects the current flowing in the power storage device 22, and outputs the detected current to the control circuit 321. As shown in FIG. 1, a shunt resistance 325 is provided. The shunt resistance 325 is connected in series with the switch 42 between the power storage device 22 and each of the separation switch 43 and the vehicle load 52. The current detection circuit 324 detects the voltage across the shunt resistance 325. The current flowing in the shunt resistance 325 can be calculated based on the voltage across the shunt resistance 325 and the resistance value thereof.

The current detection circuit 334 detects the current flowing in the separation switch 43, and outputs the detected current to the control circuit 311. As shown in FIG. 1, a shunt resistance 335 is provided. The shunt resistance 335 is connected in series with the separation switch 43 between each of the generator 1, the vehicle load 51, and the switch 41 and each of the vehicle load 52 and the switch 42. The current detection circuit 334 detects the voltage across the shunt resistance 335. The current flowing in the shunt resistance 335 can be calculated based on the voltage across the shunt resistance 335 and the resistance value thereof.

When a ground fault occurs, a large current (ground fault current) is produced, or the voltage decreases, and therefore the ground fault can be detected by the voltage detection units or the current detection units. For example, when the switches 41 and 42 and the separation switch 43 are on, if the voltage detected by any of the voltage detection circuits 313, 323, 332, and 333 is smaller than a predetermined value, or the current detected by any of the current detection circuits 314, 324, and 334 is larger than a predetermined value, it may be detected that a ground fault occurred. These predetermined values may each be set in advance and stored in a storage medium.

In response to this ground fault detection, the control circuits 311 and 321 respectively output the provisional control signals S31 and S32 for switching off the separation switch 43. As described above, this is for switching off the separation switch 43 regardless of whether the ground fault occurred in the first system 71 or the second system 72. The first system 71 and the second system 72 are thus separated from each other.

In this state, if the voltage detected by the voltage detection circuit 313 or 332 is smaller than the predetermined value, or the current detected by the current detection circuit 314 is larger than the predetermined value, it is determined that a ground fault has occurred on the first system 71 side, and the control circuit 311 switches off the switch 41.

Alternatively, in the above-described state, if the voltage detected by the voltage detection circuit 323 or 333 is smaller than the predetermined value, or the current detected by the current detection circuit 324 is larger than the predetermined value, it is determined that a ground fault has occurred on the second system 72 side, and the control circuit 321 switches off the switch 42.

Incidentally, when such a ground fault occurs, it is desirable that the separation switch 43 is switched off more reliably than the switches 41 and 42. For example, when a ground fault has occurred in the first system 71, even if the switch 41 cannot be switched off, it is possible to prevent the ground fault from influencing the second system 72 as long as the separation switch 43 can be switched off. Power can therefore be supplied from the power storage device 22 to the vehicle load 52 in the second system 72. Note that if a ground fault has occurred between the power storage device 21 and the switch 41 in the first system 71, for example, the ground fault can be prevented from influencing the second system 72 as long as the switch 41 is switched off. However, in the case where a ground fault has occurred on the side of the switch 41 that is opposite to the power storage device 21 side, even if the switch 41 is switched off, the ground fault and the second system 72 side cannot be cut off, but if the separation switch 43 is switched off, the cut-off can be realized. In other words, regardless of whether the ground fault in the first system 71 occurs on the power storage device 21 side of the switch 41 or on the side opposite to the power storage device 21, the above-described cut-off can be realized by the switching off the separation switch 43, regardless of the reliability of the operation of the switch 41.

Similarly, in the case where a ground fault has occurred in the second system 72, even if the switch 42 cannot be switched off, the ground fault can be prevented from influencing the first system 71 side as long as the separation switch 43 can be switched off. It is therefore desirable that the separation switch 43 is reliably switched off with priority over the switching off of the switches 41 and 42.

In view of this, the switch apparatus 10 is provided with the control circuits 311 and 321 and the logic circuit 11. Accordingly, even if either one of the control circuits 311 and 321 attempts to maintain the on state of the separation switch 43 due to a malfunction, the other one can switch off the separation switch 43. For example, even if the control circuit 311 outputs the ON provisional control signal S31 due to a malfunction, the control circuit 321 appropriately outputs the OFF provisional control signal S32, and thus the logic circuit 11 outputs the OFF control signal S3. The separation switch 43 can therefore be switched off more reliably.

Also, as described above, the control circuits 311 and 321 control the switches 41 and 42 independently from each other. Specifically, the control circuit 311 controls the switch 41 independently from the control circuit 321, and the control circuit 321 controls the switch 42 independently from the control circuit 311. The processing of the control circuits 311 and 321 can thus be made simpler than in the case of a structure in which the switches 41 and 42 are controlled by the control circuits 311 and 321. Also, the need for logic circuits for the switches 41 and 42 is eliminated, thus making it possible to reduce manufacturing cost and the circuit scale.

Figure 3:
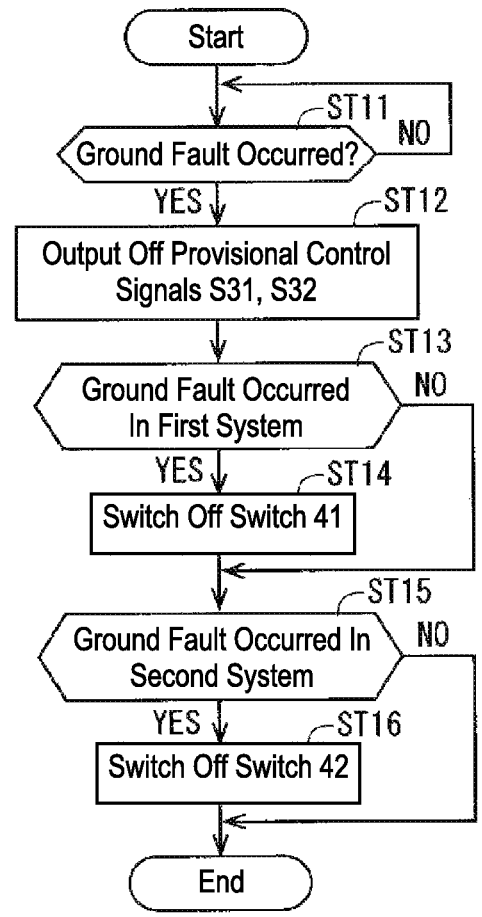
FIG. 3 is a flowchart showing an example of operations of the control circuits.

FIG. 3 is a flowchart showing an example of operations of the control circuits 311 and 321. In step ST11, the control circuits 311 and 321 respectively determine whether or not a ground fault has occurred. Note that it is sufficient that the control circuits 311 and 321 transmit the determination results to each other. Accordingly, even if the control circuits 311 and 321 detect ground faults at different locations, the control circuits 311 and 321 can recognize that ground faults have occurred.

If it was determined that a ground fault has occurred, in step ST12, the control circuits 311 and 321 respectively output the OFF provisional control signals S31 and S32. Next, in step ST13, the control circuit 311 determines whether or not a ground fault has occurred in the first system 71. If it was determined that a ground fault has occurred in the first system 71, in step ST14, the control circuit 311 switches off the switch 41. After step ST14, or if it was determined in step ST13 that a ground fault has not occurred in the first system 71, then in step ST15, the control circuit 321 determines whether or not a ground fault has occurred in the second system 72. If it was determined that a ground fault occurred in the second system 72, the control circuit 321 switches off the switch 42. If it was determined that a ground fault has not occurred in the second system 72, processing is ended without executing step ST16.

Note that the execution order of the pair of steps ST13 and ST14 and the pair of steps ST15 and ST16 may be reversed. Also, step ST12 does not necessarily need to be executed between steps ST11 and ST13, and need only be executed after an affirmative determination is made in step ST11.

Note that in the case where the ground fault in the first system 71 occurred on the power storage device 21 side of the switch 41, as long as the control circuit 311 switches off the switch 41, the ground fault can be prevented from influencing the power storage device 22 even if the separation switch 43 is switched on. In other words, it is desirable that the separation switch 43 is switched off more reliably in order to prevent the ground fault in the first system 71 from influencing the second system 72, but if the ground fault can be prevented from influencing the second system 72 by switching off the switch 41, then the separation switch 43 may be switched on. Accordingly, at this time, the control circuits 311 and 321 may output the provisional control signals S31 and S32 for switching on the separation switch 43. According to this configuration, the power storage device 22 can supply power to the vehicle loads 51 and 52. A specific processing example will be described below.

For example, in response to the ground fault in the first system 71, the switch 41 and the separation switch 43 are in the off state, and the control circuits 311 and 321 respectively output the provisional control signals S31 and S32 in order to switch on the separation switch 43 again. If a ground fault has occurred on the generator 1 or vehicle load 51 side of the switch 41, a ground fault current flows through the switch 42 and the separation switch 43 from the power storage device 22. In opposite terms, in this state, if the current flowing through the power storage device 22 is smaller than a predetermined value, it can be determined that a ground fault has occurred on the power storage device 21 side of the switch 41. Accordingly, when that current is smaller than the predetermined value, the separation switch 43 is maintained in the on state. The power storage device 22 can thus supply power to the vehicle load 51 as well. However, when the aforementioned current is larger than the predetermined value, the control circuits 311 and 321 respectively output the provisional control signals S31 and S32 in order to turn off the separation switch 43. Accordingly, it is possible to prevent the ground fault from influencing the power storage device 22.

Note that in the case where it was determined that a ground fault occurred on the power storage device 21 side of the switch 41, the control circuit 321 can switch off the separation switch 43 on its own even if the control circuit 311 runs out of control and switches on the switch 41. Accordingly, in this case as well, it is possible to prevent the ground fault from influencing the second system 72. Note that the control circuit 321 can recognize the out-of-control state of the control circuit 311 if an appropriate signal is not received from the control circuit 311, for example.

Also, in the second system 72, similar processing can be performed when a ground fault occurs on the power storage device 22 side of the switch 42. Specifically, if the control circuit 311 switches off the switch 42 at this time, the ground fault can be prevented from influencing the power storage device 21 even if the separation switch 43 is switched on, and therefore the control circuits 311 and 321 may output the provisional control signals S31 and S32 for switching on the separation switch 43. The generator 1 or the power storage device 21 can therefore supply power to not only the vehicle load 51, but also the vehicle load 52.

If the vehicle loads 51 and 52 have the same function, function redundancy of the vehicle loads 51 and 52 can be realized by supplying power to both of the vehicle loads 51 and 52.

Power Supply for Control Circuit

As shown in FIG. 1, the control circuit 311 operates upon receiving power from the power supply circuit 312. For example, the input side of the power supply circuit 312 is connected to the power storage devices 21 and 22 via the diodes D11 and D21 respectively. The forward direction of the diode D11 is the direction in which current flows from the power storage device 21 to the power supply circuit 312, and the forward direction of the diode D21 is the direction in which current flows from the power storage device 22 to the power supply circuit 312. The forward direction of the diode D 11 and the forward direction of the diode D21 are the same from the viewpoint of the power supply circuit 312, and the diodes D11 and D21 avoid the generation of sneak current between the power storage devices 21 and 22. The power supply circuit 312 converts an input voltage to a voltage that is appropriate as an operating voltage for the control circuit 311, and outputs the converted voltage. The power supply circuit 312 is a switching regulator, for example.

Similarly to the control circuit 311, the control circuit 321 also operates upon receiving power from the power supply circuit 322. For example, the input side of the power supply circuit 322 is connected to the power storage devices 21 and 22 via the diodes D12 and D22 respectively. The forward direction of the diode D12 is the direction in which current flows from the power storage device 21 to the power supply circuit 322, and the forward direction of the diode D22 is the direction in which current flows from the power storage device 22 to the power supply circuit 322. The forward direction of the diode D12 and the forward direction of the diode D22 are the same from the viewpoint of the power supply circuit 322, and the diodes D12 and D22 avoid the generation of sneak current between the power storage devices 21 and 22. The power supply circuit 322 converts an input voltage to a voltage that is appropriate as an operating voltage for the control circuit 321, and outputs the converted voltage. The power supply circuit 322 is a switching regulator, for example.

According to this configuration, even if either one of the power storage devices 21 and 22 disappears, the other one can supply power to the control circuits 311 and 321.

Switch Apparatus

The switch apparatus 10 includes a package, for example. All of the above-described configurations included in the switch apparatus 10 may be accommodated in this package. Accordingly, the switch apparatus 10 can be handled as a single body, and attachment of the switch apparatus 10 is easy. Also, all of the above-described configurations included in the switch apparatus 10 may be mounted on a predetermined substrate.

Vehicle

Figure 4:
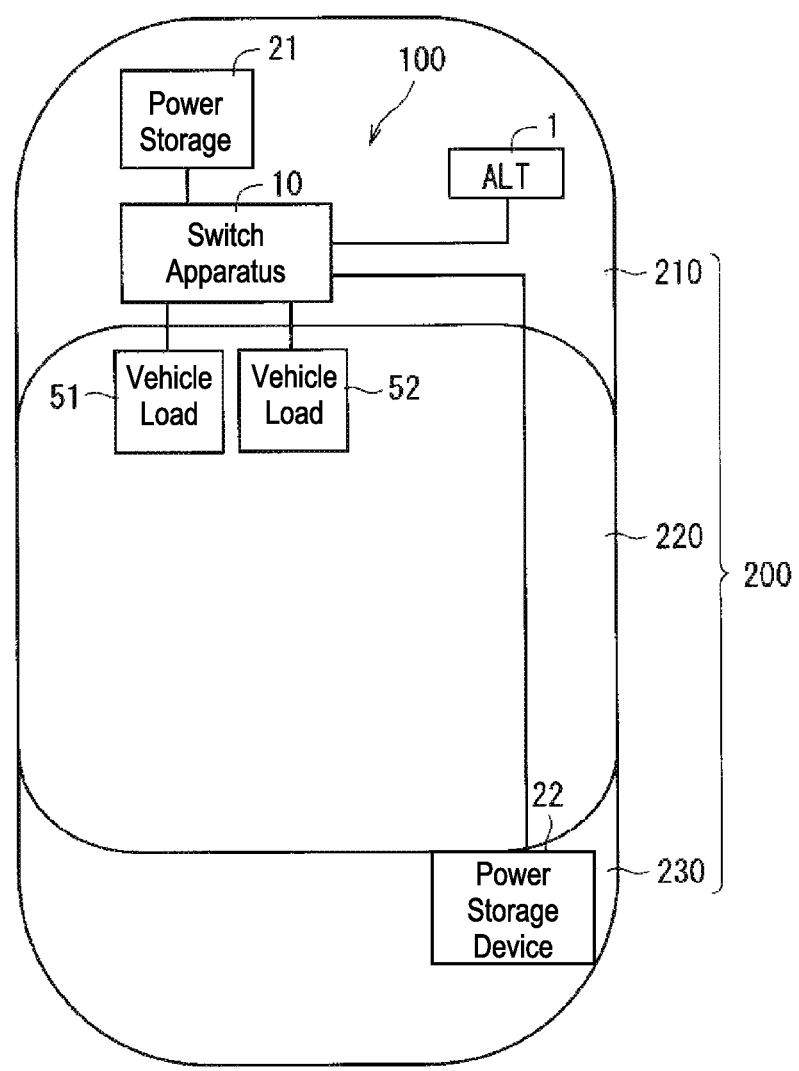
FIG. 4 is a block diagram schematically showing an example of the on-vehicle power supply system.

FIG. 4 is a block diagram schematically showing an example of the configuration of the on-vehicle power supply system 100. As shown in FIG. 4, the on-vehicle power supply system 100 is installed in a vehicle 200. The vehicle 200 is provided with an engine room 210, a compartment 220, and a luggage room 230, for example. The luggage room 230 is provided on the side of the compartment 220 that is opposite to the engine room 210 side. The engine room 210 is provided in the forward portion of the vehicle 200 with respect to the traveling direction, for example.

As shown in FIG. 4, the power storage device 21, the switch apparatus 10, and the generator 1 are arranged in the engine room 210. Also, the power storage device 22 is arranged on the luggage room 230 side. The vehicle loads 51 and 52 are arranged on the compartment 220 side, for example.

Switch Control Example

The following describes an example of control of the switches 41 and 42 and the separation switch 43.

Power Running State and Parked State

When the vehicle is running under power or parked, the control circuits 311 and 321 respectively switch on the switches 41 and 42. The fact that the vehicle is running under power may be notified to the control circuits 311 and 321 by the engine ECU, for example. Note that the phrase "running under power" used here refers to traveling of the vehicle in the state where the accelerator position is higher than the initial value, for example. Also, the fact that the vehicle is parked may be determined based on an engine stop notification from the engine ECU, for example.

When the vehicle is running under power or parked, the switches 41 and 42 turn on, and therefore the vehicle loads 51 and 52 receive power at that time. Accordingly, function redundancy of the vehicle loads 51 and 52 can be realized. Also, the control circuits 311 and 321 may switch on or switch off the separation switch 43. When the separation switch 43 has been switched on, the generator 1 and the power storage devices 21 and 22 can supply power to the vehicle loads 51 and 52.

When the separation switch 43 has been switched off, the vehicle load 51 receives power from the power storage device 21, and the vehicle load 52 receives power from the power storage device 22. In other words, power can be supplied to the vehicle loads 51 and 52 in the state where the first system 71 and the second system 72 are independent from each other. Also, if a ground fault occurs in either one of the first system 71 and the second system 72 in this state, the ground fault can be prevented from influencing the other system without waiting for a ground fault occurrence determination. If the separation switch 43 has been switched on, it is conceivable for a fault to occur in the supply of power to the vehicle loads 51 and 52 in the period from when the ground fault occurs to when the separation switch 43 is switched off. This is because if the separation switch 43 is switched off when the vehicle is running under power or parked, power can be stably supplied to the vehicle load 52 even if a ground fault occurs in the first system 71 and to the vehicle load 51 even if a ground fault occurs in the second system 72.

Figure 5:
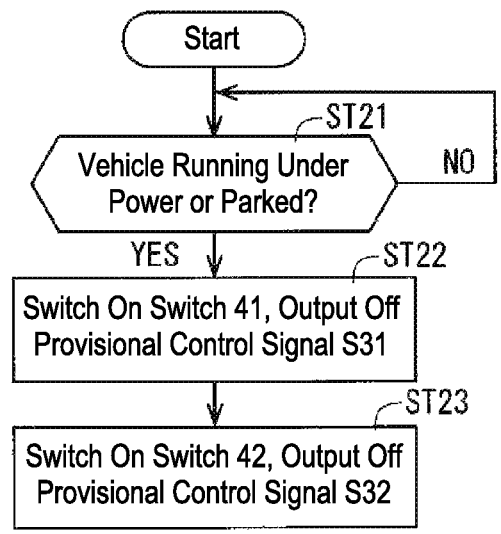
FIG. 5 is a flowchart showing an example of operations of the control circuits.

FIG. 5 is a flowchart showing an example of the above-described operations of the control circuits 311 and 321. In step ST21, the control circuits 311 and 321 determine whether or not the vehicle is running under power or is parked. This determination can be made based on notifications from an external apparatus (e.g., the engine ECU), for example. If a negative determination is made, the control circuits 311 and 321 execute step ST21 again.

If an affirmative determination is made, in step ST22, the control circuit 311 switches on the switch 41 and outputs the OFF provisional control signal S31. Next, in step ST23, the control circuit 321 switches on the switch 42, and outputs the OFF provisional control signal S32. Note that the execution order of steps ST22 and ST23 may be reversed, or steps ST22 and ST23 may be executed in parallel.

Switches

For example, a configuration is possible in which the switches 41 and 42 are normally-on switches, and the separation switch 43 is a normally-off switch. Accordingly, even if the control circuits 311 and 321 stop operating when the vehicle is parked, for example, the switches 41 and 42 can be switched on, and the separation switch 43 can be switched off. It is thus possible to reduce power consumption when the vehicle is parked.

Calculation of Charge Rate of Power Storage Device

Calculation of Charge Rate Based on Open Circuit Voltage

The terminal voltage of the power storage device 21 detected by the voltage detection circuit 313 when the switch 41 is off can be deemed to be the open circuit voltage of the power storage device 21. The control circuit 311 may calculate the charge rate of the power storage device 21 based on this open circuit voltage. The relationship between open circuit voltage and charge rate may be set in advance and stored in a storage medium, for example. The relationship between open circuit voltage and charge rate can obtained in advance with substantial accuracy, and therefore the control circuit 311 can obtain the charge rate of the power storage device 21 with high precision. This calculation will also be called high-precision calculation hereinafter.

Note that it is desirable that when the switch 41 has been switched off, the switch 42 and the separation switch 43 are switched on in order to maintain the supply of power to the vehicle loads 51 and 52. In other words, it is desirable that the switch 42 and the separation switch 43 are switched on when high-precision calculation is performed.

Figure 6:
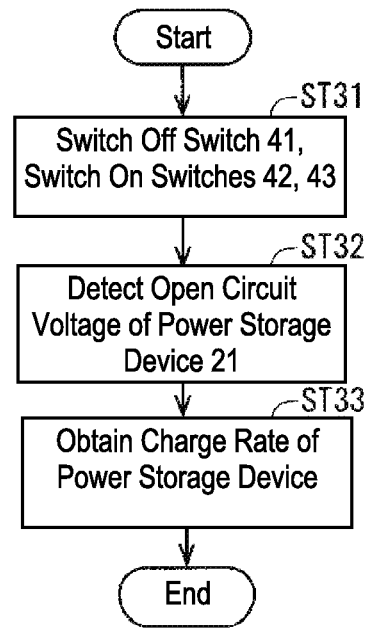
FIG. 6 is a flowchart showing an example of operations of the control circuits.

FIG. 6 is a flowchart showing an example of operations of the control circuits 311 and 321 when calculating the charge rate of the power storage device 21. First, in step ST31, the control circuit 311 switches off the switch 41, the control circuit 321 switches on the switch 42, and the control circuits 311 and 321 respectively output the ON provisional control signals S31 and S32. The separation switch 43 thus turns on. Next, in step ST32, the voltage detection circuit 313 detects the terminal voltage of the power storage device 21 as the open circuit voltage, and outputs the open circuit voltage to the control circuit 311. Next, in step ST33, the control circuit 311 calculates the charge rate of the power storage device 21 based on the open circuit voltage. Note that after the open circuit voltage has been calculated, the control circuits 311 and 321 may return to the switches 41 and 42 and the separation switch 43 to the states that were realized before step ST31.

Calculation of Charge Rate Based on Current

In the above-described high-precision calculation method, the switch 41 needs to be switched off in order to calculate the open circuit voltage of the power storage device 21. Power therefore cannot be supplied from the power storage device 21. In view of this, the charge rate of the power storage device 21 may be calculated using the following method that utilizes the charge rate calculated in high-precision calculation when the switch 41 has been switched on. In other words, after the switch 41 has been temporarily switched off, and the charge rate has been obtained by high-precision calculation, the switch 41 is then switched on, and the charge rate is calculated as follows.

For example, a configuration is possible in which when the switch 41 has been switched on, the control circuit 311 detects the current flowing in the power storage device 21 with use of the current detection circuit 314, and uses a known technique to calculate the charge rate of the power storage device 21 based on the charge rate calculated using the open circuit voltage and based on an integral value of the detected current. This calculation has a lower charge rate calculation precision than the high-precision calculation, but the switch 41 can be switched on, and therefore the power storage device 21 can be caused to function as a power supply for the vehicle load 51. Hereinafter, calculation based on integral current will also be called low-precision calculation.

The control circuit 311 may repeatedly perform high-precision calculation and low-precision calculation. For example, high-precision calculation may be performed each time low-precision calculation is performed multiple times. Also, in low-precision calculation, it is sufficient that the charge rate is calculated based on the charge rate that was calculated in the immediately previous high-precision calculation and based on the integral current. Accordingly to this configuration, error that arises each time low-precision calculation is performed multiple times can be reduced each time high-precision calculation is performed.

Note that although the charge rate of the power storage device 21 is described in the above example, the same applies to the power storage device 22 as well. Specifically, in the state where the switch 41 and the separation switch 43 are on and the switch 42 is off, the terminal voltage of the power storage device 22 is detected as the open circuit voltage, and the charge rate of the power storage device 22 is calculated based on the open circuit voltage. The charge rate of the power storage device 22 can thus be calculated with high precision.

On the other hand, when the switch 41 has been switched off, the charge rate of the power storage device 22 is calculated using the current flowing in the power storage device 22 and the charge rate that was calculated based on the open circuit voltage. In the case of the power storage device 22 as well, high-precision calculation and low-precision calculation may be executed repeatedly.

The configurations described in the above embodiments and variations can be appropriately combined as long as no contradiction arises.

Although this invention has been described in detail above, the above description is illustrative in all respects, and this invention is not limited to the above description. It will be understood that numerous variations not illustrated here can be envisioned without departing from the range of this invention.

FIG. 1

21, 22 Power storage device
51, 52 Vehicle load
311, 321 Control circuit
312, 322 Power supply circuit
313, 323, 332, 333 Voltage detection circuit
314, 324, 334 Current detection circuit
315, 325, 435 Shunt resistance
316, 326 Communication circuit

FIG. 2

開始 Start
ST1 Generator outputting regenerative power?
ST2 Switch on switch 41, output ON provisional control signal S31
ST3 Switch on switch 42, output ON provisional control signal S32

FIG. 3

開始 Start
ST11 Ground fault occurred?
ST12 Output OFF provisional control signals S31, S32
ST13 Ground fault occurred in first system?
ST14 Switch off switch 41
ST15 Ground fault occurred in second system?
ST16 Switch off switch 42
終了 End

FIG. 4

10 Switch apparatus
21, 22 Power storage device
51, 52 Vehicle load

FIG. 5

開始 Start
ST21 Vehicle running under power or parked?
ST22 Switch on switch 41, output OFF provisional control signal S31
ST23 Switch on switch 42, output OFF provisional control signal S32

FIG. 6

開始 Start
ST31 Switch off switch 41, switch on switches 42, 43
ST32 Detect open circuit voltage of power storage device 21
ST33 Obtain charge rate of power storage device 21
終了 End

The invention claimed is:

1. An on-vehicle power source switch apparatus comprising:
- a separation switch connected between a first system and a second system, the first system including a generator that generates power at least at a time of vehicle regeneration, a first power storage device that is charged by the generator, and a first vehicle load that receives power from the first power storage device, and the second system including a second power storage device and a second vehicle load that receives power from the second power storage device;
- a first control circuit that outputs a first provisional control signal for controlling on/off switching of the separation switch;
- a second control circuit that outputs a second provisional control signal for controlling on/off switching of the separation switch; and
- a logic circuit that switches off the separation switch when at least either one of the first provisional control signal and the second provisional control signal indicates off, and switches on the separation switch when both the first provisional control signal and the second provisional control signal indicate on,
- wherein in accordance with a start of power generation by the generator, the first control circuit and the second control circuit output the first provisional control signal and the second provisional control signal that indicate on, and when a ground fault occurs in the first system or the second system, the first control circuit and the second control circuit output the first provisional control signal and the second control signal that indicate off.

2. The on-vehicle power source switch apparatus according to claim 1, further comprising:
- a first switch that is connected between the first power storage device and each of the generator and the first vehicle load, on/off switching of the first switch being controlled by the first control circuit; and
- a second switch that is connected between the second vehicle load and the second power storage device, on/off switching of the second switch being controlled by the second control circuit.

3. The on-vehicle power source switch apparatus according to claim 2, further comprising:
- a voltage detection circuit that detects a terminal voltage of the first power storage device on a first power storage device side of the first switch,
- wherein in a state where the first switch is off, the second switch is on, and the separation switch is on, the first control circuit obtains a charge rate of the first power storage device based on the terminal voltage.

4. The on-vehicle power source switch apparatus according to claim 2,
- wherein when the vehicle is running under power or parked,
- the first control circuit switches on the first switch and outputs the first provisional control signal that indicates off, and
- the second control circuit switches on the second switch and outputs the second provisional control signal that indicates off.

5. The on-vehicle power source switch apparatus according to claim 2, wherein the first switch and the second switch are normally-on switches, and the separation switch is a normally-off switch.

6. The on-vehicle power source switch apparatus according to claim 1, comprising a package in which the separation switch, the first control circuit, the second control circuit, and the logic circuit are accommodated.

7. A control apparatus that controls an on-vehicle power source switch apparatus that includes: a separation switch connected between a first system and a second system, the first system including a generator that generates power at least at a time of vehicle regeneration, a first power storage device that is charged by the generator, and a first vehicle load that receives power from the first power storage device, and the second system including a second power storage device and a second vehicle load that receives power from the second power storage device, the control apparatus comprising:
- a first control circuit that outputs a first provisional control signal for controlling on/off switching of the separation switch;
- a second control circuit that outputs a second provisional control signal for controlling on/off switching of the separation switch; and
- a logic circuit that switches off the separation switch when at least either one of the first provisional control signal and the second provisional control signal indicates off, and switches on the separation switch when both the first provisional control signal and the second provisional control signal indicate on,
- wherein in accordance with a start of power generation by the generator, the first control circuit and the second control circuit output the first provisional control signal and the second provisional control signal that indicate on, and when it is was determined that a ground fault occurred in the first system or the second system, the first control circuit and the second control circuit output the first provisional control signal and the second control signal that indicate off.

8. The on-vehicle power source switch apparatus according to claim 3,
wherein when the vehicle is running under power or parked,
the first control circuit switches on the first switch and outputs the first provisional control signal that indicates off, and
the second control circuit switches on the second switch and outputs the second provisional control signal that indicates off.

9. The on-vehicle power source switch apparatus according to claim 3, wherein the first switch and the second switch are normally-on switches, and the separation switch is a normally-off switch.

10. The on-vehicle power source switch apparatus according to claim 4, wherein the first switch and the second switch are normally-on switches, and the separation switch is a normally-off switch.

11. The on-vehicle power source switch apparatus according to claim 2, comprising a package in which the separation switch, the first control circuit, the second control circuit, and the logic circuit are accommodated.

12. The on-vehicle power source switch apparatus according to claim 3, comprising a package in which the separation switch, the first control circuit, the second control circuit, and the logic circuit are accommodated.

13. The on-vehicle power source switch apparatus according to claim 4, comprising a package in which the separation switch, the first control circuit, the second control circuit, and the logic circuit are accommodated.

14. The on-vehicle power source switch apparatus according to claim 5, comprising a package in which the separation switch, the first control circuit, the second control circuit, and the logic circuit are accommodated.

* * * * *